(12) United States Patent
Valdez

(10) Patent No.: US 6,733,066 B1
(45) Date of Patent: May 11, 2004

(54) SHORT PERSON VEHICLE DOOR OPENER AID

(76) Inventor: Dionna Valdez, 5708 Carlson Dr., Sacramento, CA (US) 95819

( * ) Notice: Subject to any disclaimer, the term of this patent is extended or adjusted under 35 U.S.C. 154(b) by 116 days.

(21) Appl. No.: 10/292,967

(22) Filed: Dec. 30, 2002

(51) Int. Cl.[7] .............................. B60J 5/04; B60N 5/00; B60R 13/02
(52) U.S. Cl. .................. 296/152; 296/146.7; 296/39.1; 296/189
(58) Field of Search ........................... 296/146.1, 146.7, 296/146.9, 148, 149, 152, 153, 39.1, 37.13, 189, 199, 75; 49/502, 460; 16/110

(56) References Cited

U.S. PATENT DOCUMENTS

| | | | | |
|---|---|---|---|---|
| 4,310,193 A | * | 1/1982 | Kolleas | ........................ 296/75 |
| 4,819,984 A | * | 4/1989 | Wylie | ........................ 296/152 |
| 5,180,089 A | * | 1/1993 | Suman et al. | ............... 296/153 |
| 5,205,606 A | * | 4/1993 | Cassese | ....................... 296/153 |
| 5,261,716 A | * | 11/1993 | Phelps | ........................ 296/37.8 |
| 5,340,189 A | * | 8/1994 | Goodman | .................... 296/152 |
| 5,446,999 A | * | 9/1995 | Inaba et al. | ............... 296/146.5 |
| 5,533,778 A | * | 7/1996 | Sheridan | ...................... 296/152 |
| 5,910,077 A | * | 6/1999 | Aumiller et al. | .......... 296/146.1 |
| 6,101,765 A | * | 8/2000 | Hashimoto et al. | ....... 296/146.5 |

* cited by examiner

*Primary Examiner*—Joseph D. Pape
*Assistant Examiner*—Greg Blankenship
(74) *Attorney, Agent, or Firm*—Mark C. Jacobs

(57) ABSTRACT

A device to aid vehicle occupants to open a door wider than would be possible by merely opening it with one arm extended. The device comprises a main body having a backer in which is disposed a moveable insert for extending the length of the main body. The main body may be attached by a rear surface mounted Velcro® layer for engagement with a second Velcro® layer on the interior panel of the door of the vehicle. A pair of spaced brackets mounted to the main body are used to mount the main body within a pocket attached to the door. An impact receiver is optionally removably adhesed to the main body, and is adapted to receive the impact of the driver's foot. The impact receiver is removable for easy cleaning should it become soiled.

14 Claims, 3 Drawing Sheets

US 6,733,066 B1

SHORT PERSON VEHICLE DOOR OPENER AID

FIELD OF THE INVENTION

This application pertains to a device to be used primarily by short people to aid them in the opening of a vehicle door, and especially the front door of a two door car. The device is intended primarily for use on two-door vehicles due to the relatively heavier weight and larger size of the front door of two-door cars or trucks.

BACKGROUND OF THE INVENTION

Applicant is a woman of short stature and with arms and legs appropriate for her just over five feet height. As a successful business woman, she finds herself driving an imported sporty low to the road 4-door vehicle. Being an upscale car, it has very heavy doors, and she being of proportioned size but short in stature, finds it difficult to push the door open far enough to exit the vehicle with grace. She has discussed this problem with other friends and has determined that their respective arms are too short to push the door open wide enough to be able to easily exit. Therefore, applicant discovered the need for an aid in opening the car door. An aid, that could be easily attached to the vehicle, but which would not detract from the potential resale value of the vehicle; and which would be easily installed, preferably without tools.

Her research revealed that others share her difficulty and that there were no products on the market that would serve to help people with short arms and short legs to easily open the car or truck door such that they could exit the vehicle. She also discovered that in certain cars, where the person is seated low to the ground, exiting of the vehicle is even more difficult. Thus is seen the necessity of this invention even more. This apparent fact was confirmed by a search carried out on this subject matter.

The following patents turned up, none of which anticipates and none of which in combination renders the invention of this application obvious.

| | |
|---|---|
| 5,542,736 | KONDO |
| 5,529,370 | VEIT |
| 5,076,870 | SUNBORN |
| 3,610,684 | RICHTER |
| 1,486,566 | CRECELIUS |
| 4,819,984 | WYLIE |

The invention of this application accordingly comprises the device possessing the features, properties, the selection of components which are amplified in the following detailed disclosure, and the scope of the application of which will be indicated in the appended claims.

For a fuller understanding of the nature and objects of the invention, reference should be made to the following detailed description, taken in conjunction with the accompanying drawings.

SUMMARY OF THE INVENTION

The invention of this application is a device which mounts either directly to a door panel of a vehicle, or if the vehicle has an inwardly projecting pocket for the storage of miscellaneous vehicle related items, the device mounts within and on the pocket of the vehicle door. The device includes a main body which receives a pad adapted to receive the impact of one's foot. The main body is attached to the vehicle door by way of a loop and pile closure, such as Velcro®, pad having an adhesive layer thereon, when no door pocket is available in the vehicle. In this first embodiment, the Velcro® on the rear wall of the main body engages a Velcro® segment pre-applied to the door panel, in order to attach the unit directly to the door panel.

For more expensive and/or more recent vehicles that do have a door pocket, the main body is attached with a pair of brackets that are attached to and which mount within the pocket of the door panel.

The Velcro® sheet used for attachment directly to the door panel is not required, as the main body is retained in position by the brackets The impact pad is the same used in both embodiments.

It is a first object of this invention to provide a device in two separate versions, one of which mounts directly to a door panel and the other which mounts to a pocket of a vehicle door to aid the driver or passenger to open the door.

It is another object to provide a device that attaches to a vehicle door and which is used in combination with foot action to open the vehicle door to the extent desired.

It is a third object of this invention to provide a device which aids in the opening of the door and which is installed in a nonpermanent fashion.

It is a fourth object to provide a device to aid short drivers in opening a car door and which will not damage the pocket or panel of the vehicle to which it is attached.

Other objects of the invention will in part be obvious and will in part appear hereinafter.

DESCRIPTION OF THE PREFERRED EMBODIMENT

Figure 1:
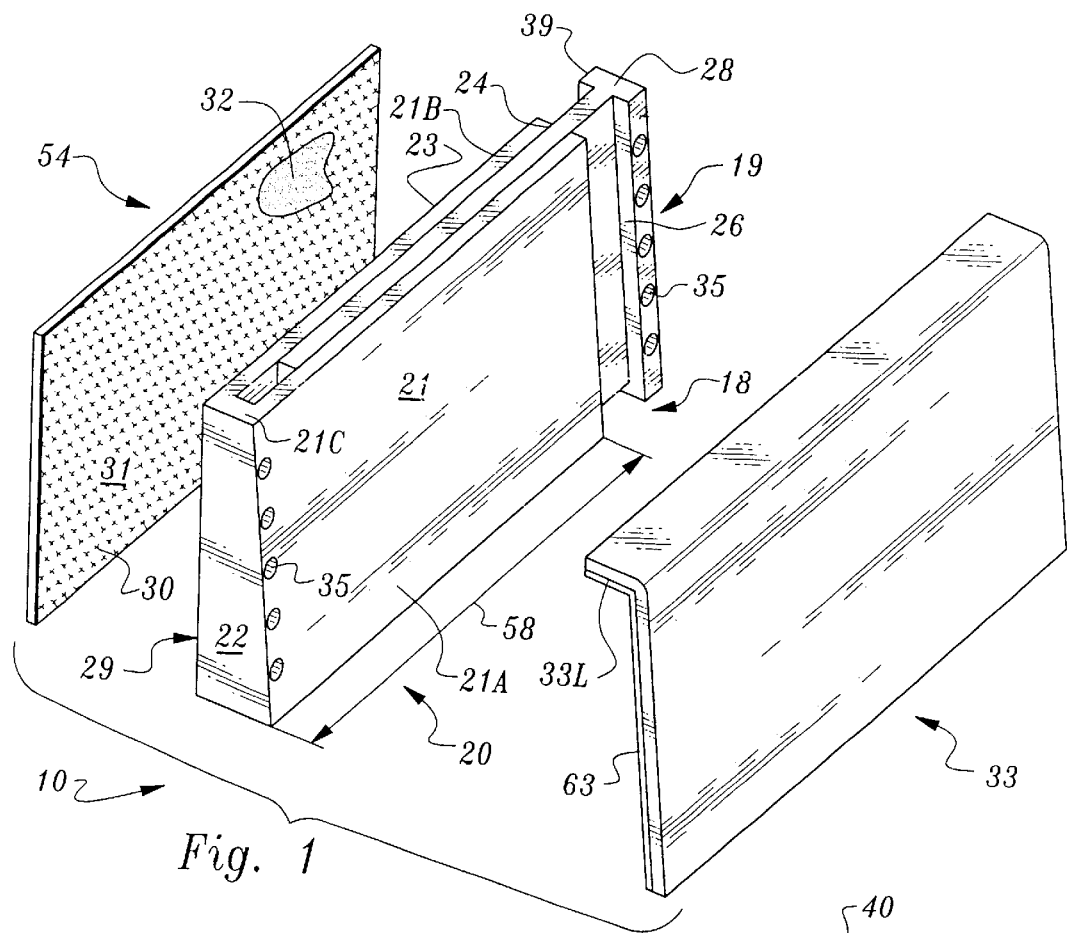
FIG. 1 is an exploded view of the first embodiment of this invention.
Figure 9:
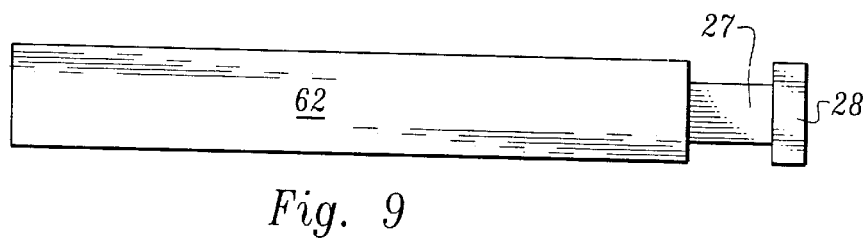
FIG. 9 is a bottom plan view of the main body of this invention.

In FIG. 1, there is shown the first embodiment of this invention. The main body 18 is utilized in both embodiments. In the first embodiment, the main body is embellished with hook and loop attachment means as will be discussed. In the second embodiment, a bracket is utilized in conjunction with the main body for the mounting thereof. In both embodiments, the main body comprises an insert 19 and a backer 20. The backer has a generally rectangular configuration viewed from the front, and has a body which is generally U-shaped viewed from the top. This U-shape comprises a front section 21A, a rear section 21B, and a transverse section 21C joining them, and a horizontal slot there between, 24. The top surface of this generally U-shaped member is designated 23. It is to be seen that whereas the rear wall 29 is generally perpendicular or normal to the top surface 23, the front wall 21 of section 21A is sloped rearwardly and upwardly to provide a right trapezoidal member in cross section but for the interruption of the slot 24. The bottom wall 62 of the backer 20 is seen in FIG. 9 and discussed elsewhere. The bottom surface of the backer is seen in FIG. 9, and covers over the slot.

Figures 7A, 7B, 8:
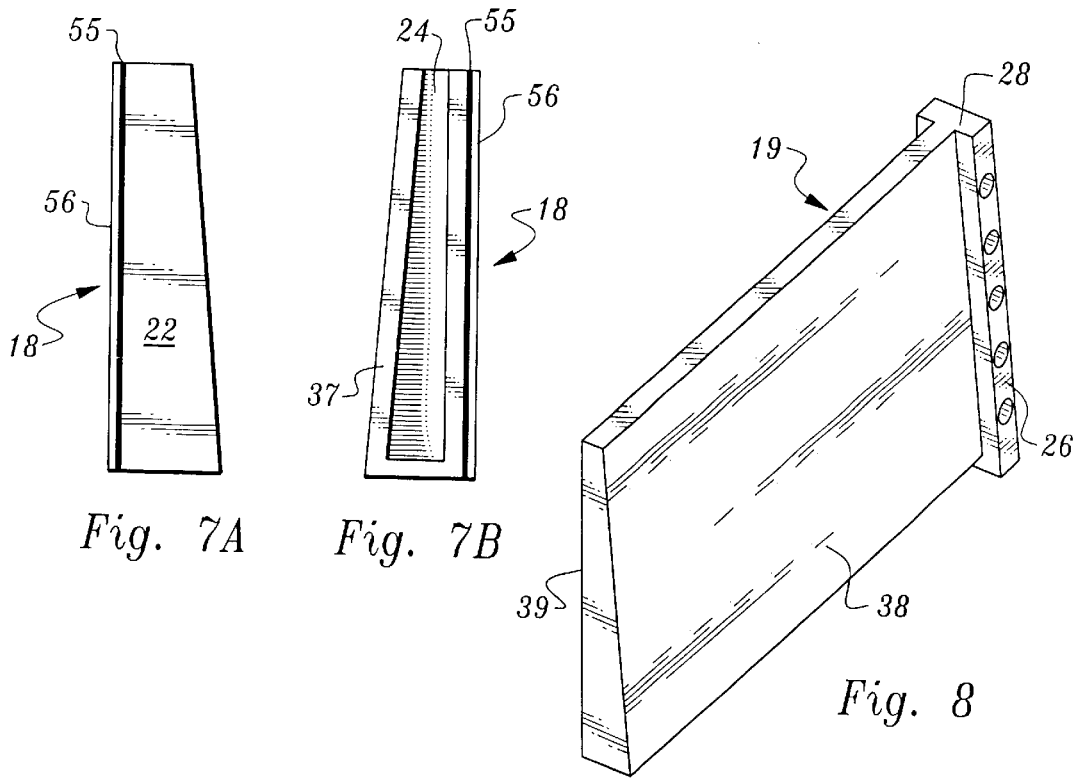
FIG. 7A is a right side elevational view.
FIG. 7B is a left side elevational view of the backer portion of the first embodiment of this invention.
FIG. 8 is a front left perspective view of the insert portion of the backer member.

In both embodiments, as noted earlier the backer and its insert are of the same configuration. Details of the insert 19 are shown in FIG. 8. Here a sloping side wall is the featured element of this generally T-shaped device having a main or elevated section 27 and horizontal section 28. This insert 19 is of a generally T-shaped configuration, though the front wall of the body area 38 and the front wall 26 of the forwardly extending section 28 are both canted at an angle greater than 90 degrees from-the-horizontal. The insert 19 is free to move laterally within the body section of the backer 20 from an abutting position to a maximum of about a distance of several inches. That way the width of the main body can be extended laterally as desired or needed.

The rear wall 39 of the insert is vertically disposed whereas the front wall 38 is disposed at an angle greater than 90 degrees such as to have a segment of a trapezoidal cross section. It is also seen that the elongated section thereof 27 is of a slightly smaller elevation than the transverse section 28, in order for it to slide within the confides of the slot of the main body which slot is covered over by the bottom wall and does not extend all the way through the main body. See FIG. 9.

Figure 6:
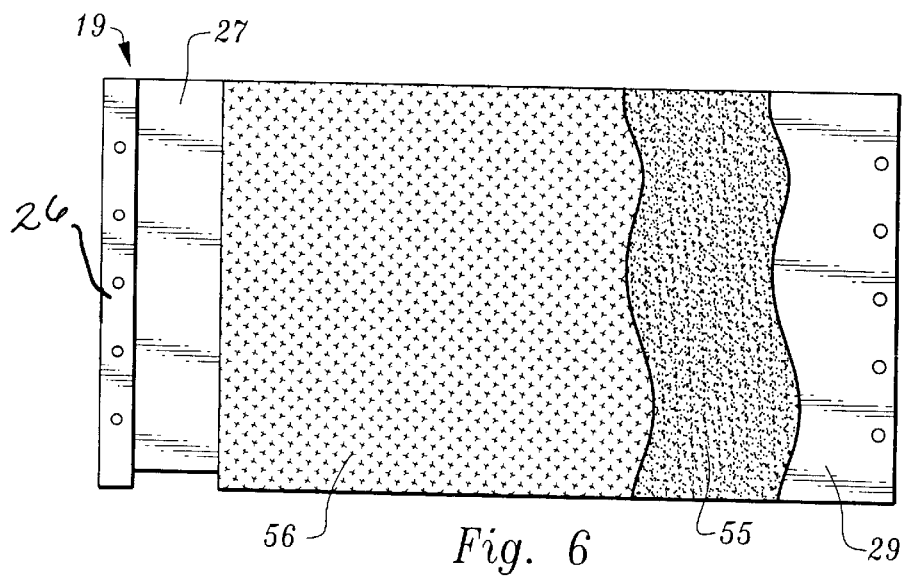
FIG. 6 is a rear elevational view of a portion of this invention's first embodiment.

In its first embodiment, the backer member 20, which has a rear wall 29 per FIGS. 1 and 6, would be made preferably of a urethane elastomer, closed cell rigid urethane foam, or natural rubber or any other suitable material similar thereto.

The main body for the first embodiment further includes a layer of adhesive 35 found on the rear surface of a glue mountable Velcro® strip having a face 56. See FIG. 6. This strip is used for mounting of the main body's two parts to an upholstered door panel of a vehicle.

Returning now to FIG. 1, the mount panel 30 includes a Velcro® face of the gender opposite that of the Velero® panel 56, such that they can be readily engaged and mated together for mounting. The Velcro® attachment portion 30 further includes an adhesive layer 32 on the rear side of the Velcro® engaging means for direct attachment to the door's interior panel 54. The door panel is the wall of the vehicle wherein no pocket is present. When a door pocket is present the second embodiment is utilized as will be described.

The impact receiver used in both embodiments is an inverted L-shaped member 33 having a slight lip 33L which overlays the backer member 20 and its insert 19. The impact receiver is the same for both embodiments.

The impact receiver 33, shown in FIG. 1, is the same for both embodiments.

Figure 2:
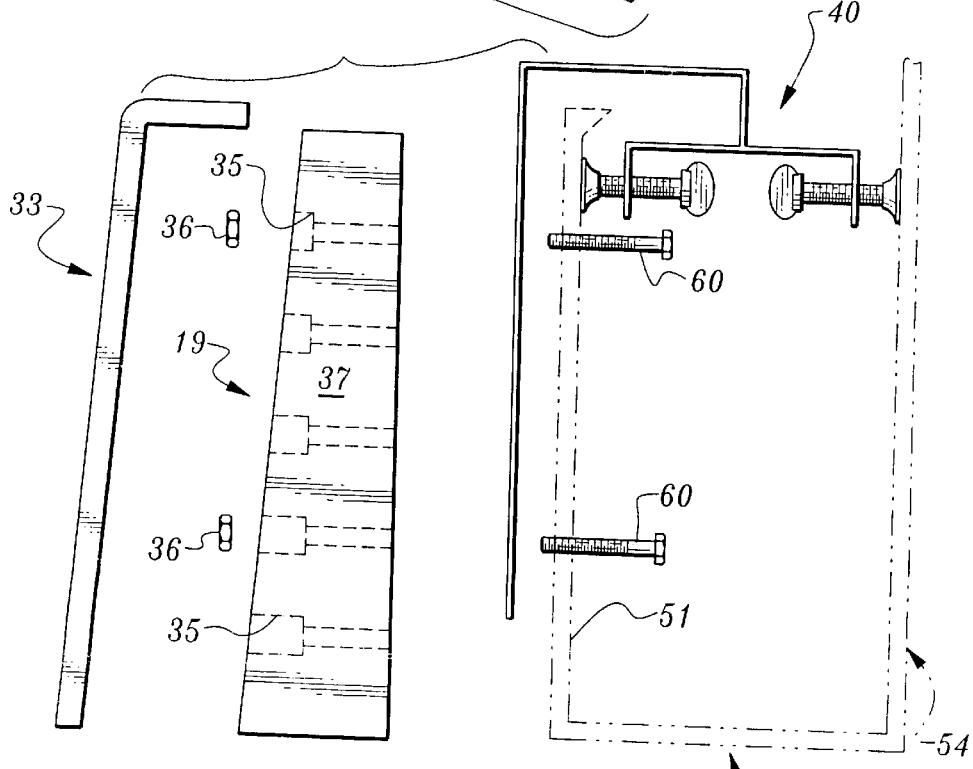
FIG. 2 is a side elevational view of the second embodiment of this invention.

In FIG. 2, which is a right side exploded elevational view of the portion of the second embodiment, it is seen that impact receiver 33 is the same as shown in FIG. 1. The right side of the insert 19 is seen to be designated 37. This wall 37 is not visible in FIG. 8. As can be seen in FIG. 1, A series of vertical spaced horizontally and vertically apertures pass through the front wall and rear wall of the stretcher. These bores are not utilized with the first embodiment, only the second embodiment for attachment to the door's pocket in a vehicle, as will be discussed infra.

Figure 4:
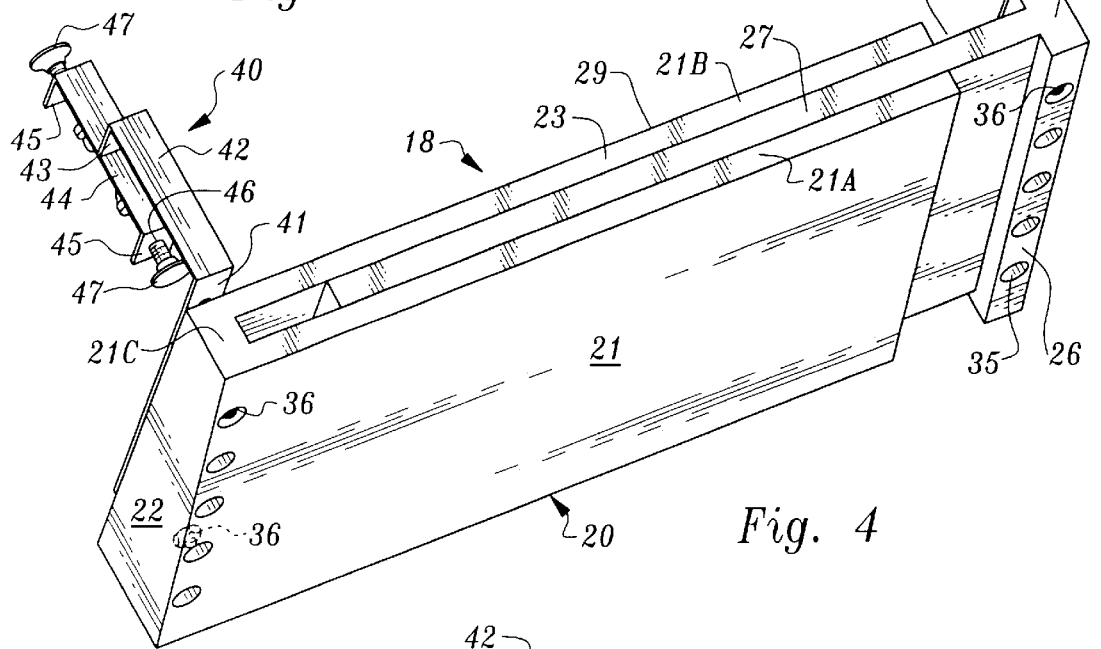
FIG. 4 is a top perspective view of the entire second embodiment of this invention and also illustrating the main body portion as used in the first embodiment

In FIG. 4, there is shown a closeup of the main body 18's backer 20 and insert 19, which components are the same in the second embodiment as noted at the outset. The trapezoidal-shaped side wall designated 22 with the U-shaped top configuration is seen to have a slot 24 between the two wings.

While using the same body comprised of elements 20 and 19, but lacking the adhesed hook and pile closure on the rear as per the first embodiment, The backer member here is mounted using a pair of spaced brackets 40 seen in FIGS. 2, 3, 4, and 5. These brackets are attached through the insert and backer respectively through the bores 35 by the placement of bolts 60, seen in FIG. 2, through the backer and through the transverse section 28 of the insert to engage with a hex or square nut 36 sized to fit flush in the respective bores 35 such that the nut does not extend forward beyond the face of the surface 21. Such recessable nuts are known to the art.

Each of the two brackets 40 comprises a first vertical section 41 which depends downwardly and attaches at any two of the series of five bores using the two recessable nuts 36, in order to adapt the bracket to the necessary elevation of the pocket of the door of the vehicle. To achieve this, vertical section 41 has a series of uniformly spaced vertically disposed bores along its elevation which is equal to or greater than the elevation of the backer. At the upper end of the main vertical member is a first horizontal section 42 which extends away in a normal direction, from the backer and the insert respectively and at its terminus is normally connected to a second downwardly disposed vertical section 43, which terminates at about the midpoint of a horizontal second section 44. At opposite ends of horizontal section 44 are a pair of third downwardly disposed vertical sections 45. These each include at least one bore 46 for the passage of a thumb type bolt 47 having a dome-shaped segment with a flat face disposed therein that can apply pressure to the inside of the door pocket spaced away wall 51, per FIG. 3. A second such dome bolt or dome shape thumb bolt 47 is found in the second bracket 40 of the same physical configuration disposed on the insert 19. These are used to tighten the brackets within the pocket of the door.

The second bracket 40, mounts to the insert 19's transverse section 28 by bolts 60, seen in FIG. 2, through the throughbores 45 in like manner to matingly engage insert nuts 36 which are the same as the nuts 36 described earlier. In FIG. 4, it is seen that in view of the independent mounting of the backer and the insert, that the insert can slide inwardly or outwardly, that is laterally, to expand the length of the main body 20 to match the length of the pocket as may be desired. This is necessary sometimes because the pocket may have a stabilizer member disposed at a location that would interfere with the mounting of the bracket 40.

Impact receiver 33, can be sized as may be desired to overlay the entire main body 18 as extended. It is recommended that the impact receiver 33 be cut to fit the ultimate extension of the main body after the main body's extension has been determined, and the entire body attached by either brackets 40 or Velcro® pad 30 to the respective pocket or door panel as the case may be. That will ensure a clean fit of the impact receiver along the length as designated by arrow 58 of the main body 18.

FIG. 2 is a side elevational view of the components previously discussed. Side wall 37 is the face of the insert not seen in FIG. 8. The bolts 60 for mounting of the bracket to the main body 18 are seen passing through bores 35 previously discussed. Bracket 40 and its various parts are seen in position to apply pressure to the spaced away wall 51 of the pocket 50 mounted on the door of the vehicle designated 54.

Figure 3:
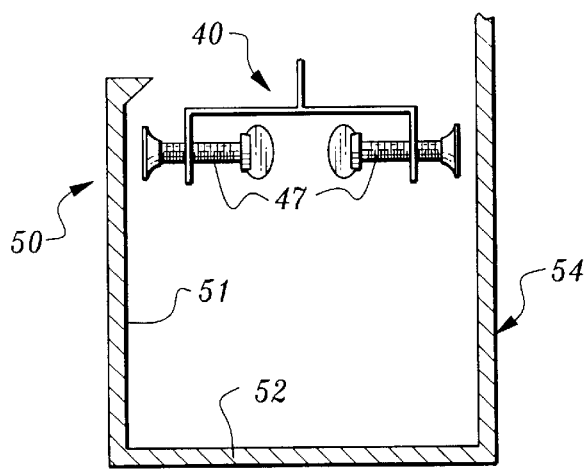
FIG. 3 is an enlarged view of a portion of the second embodiment of this invention.
Figure 5:
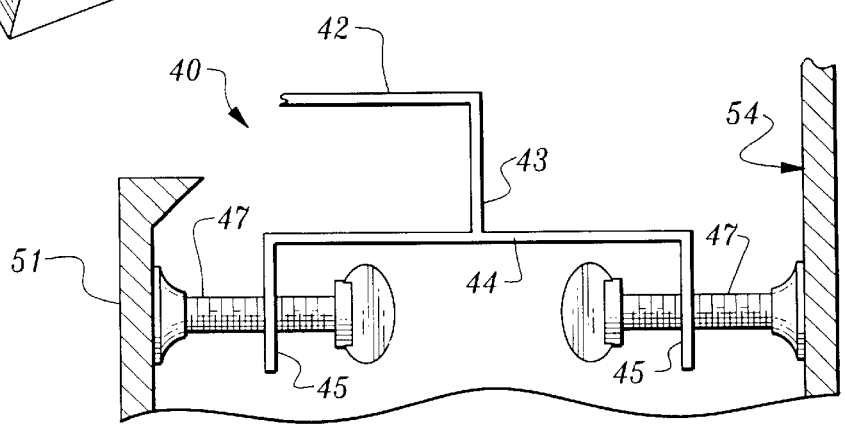
FIG. 5 is a closeup view of the components shown in FIG. 3.

In FIGS. 3 and 5, the mounting element of the bracket 40 are seen yet again in closeup. The bottom wall of the pocket 50 is set forth in more detail and denoted as 52. The dome screws used to apply pressure are shown in closeup in FIG. 5.

In FIG. 6, the rear wall of both the backer and insert are seen for the first embodiment. Here the rear wall 29 is seen to have a layer of adhesive 55 thereon, which adhesive layer serves to attach the layer of Velcro® or other loop and hoop closure 56 to the rear wall 29 of the backer.

As can be seen from FIGS. 6 and 8, the transverse section 28 of the insert for both embodiments is of a greater elevation than the horizontal member 27, such that the alignment of the total elevation of backer and insert is similar but to prevent the insert from falling through the backer, it is seen that the elevation of the insert segment 27 is less than the elevation of the insert segment 28. This is also illustrated by the bottom plan view of FIG. 9 wherein the bottom wall 62 lacks the cutout, visible in the other views showing the backer member enabling segment 27 to slide within the slot 24 forwardly, laterally, and upwardly, but not downwardly. A careful reference to FIG. 6 also shows the difference in elevation between segment 27 and segment 28 of the insert 19.

In FIG. 7A and FIG. 7B, there is seen the right and left side elevations of the main body of the invention to which has been added the Velcro® attachment means for the first embodiment. The distinction being the provision for the insert to enter via the slot 24.

USE

In order to mount the device of this invention for use, the nature of the door inside surface must first be determined. Assuming that a pocket 50 is present, then the bracket is required in order to ensure stability of the pocket and the non-destruction thereof. Thus the bracket 40 is attached ,as per FIG. 2, to the insert on one end and a second bracket 40 is mounted to the backer at the opposite end. The dome screws 48 are then set into a proper position within the pocket to carefully avoid interfering with any stabilized segments that may present in the pocket. By having the dome screws near the top of the pocket, and pressure applied by the tightening of the bolts, a resistance will be created when and as the user places an impact on the device by hitting the impact receiver with the toe or heel portion of their foot. More than likely, it may be that the right foot is used in an American driver to push the door open though other drivers may use the left foot. It is also believed that by having the face 21 disposed canted vertically that the force of the kick to push the door open will be dissipated such as to the preserve the integrity of the pocket.

On the other hand, for old trucks and small sports cars where there is no pocket on the door, the Velcro® shown in both FIGS. 1 and 6, is to be applied in conventional fashion to the door as shown in FIG. 1 and to the rear of the insert and the backer as shown in FIG. 6. The mating engagement of opposite gender Velcro® or other hook and pile connection means is well known in the art in this day and age.

It is seen that by pushing the door with the foot that a greater opening of the door can be achieved since the extension of the leg is always greater than the extension of the arm for most persons of any height. Of course, care must taken not to push the door out too hard such as to impact the door of an adjacent vehicle in a parking lot.

It is seen that I have provided a device that can be used on doors of cars, trucks, and enclosed vehicles, such as tractors, to allow short persons to open the door to the desired width to facilitate exit from the vehicle.

It is believed that poly urethane elastomer may be used for the impact receiver. This may be molded to form an inverted L-shaped member, or a sheet material can be used and folded over to form an L-shaped member, or a flat sheet may be used for the vertical face only of the main body as may be desired. Optionally, a layer of nonpermanent adhesive, such as used on Post-it® brand notes and other materials can be applied to help retain the impact receiver on the face of the main body 18. Such optional layer is designated 63 and seen in FIG. 1 helps retain the impact receiver in position, yet permits removal thereof for cleaning.

It is believed that the backer and insert of the main body can be made of various elastomer materials, though a closed cell sponge, preferably made of polyurethane or other flexible foam resin would be beneficial as such foam material would be capable of dissipating the energy better from the impact of the driver's or passenger's foot.

The brackets 40 may be made of metal such as aluminum or steel or high impact plastic, such as styrene or ABS, or even polycarbonate as may be desired. The advantage of the plastic is that the plastic can be colored whereas metal may require a coat of paint which may or may not be permanent. The brackets no matter what they are made of should also be color-keyed to the interior of the vehicle.

While the body of the invention may be made any color, it is preferred to have the impact receiver made in a plurality of colors to be able to color key or color match the impact receiver to the car interior, to avoid the look of an add on item.

Since certain changes may be made in the described apparatus without departing from the scope of the invention herein involved, it is intended that all matter contained in the above description and shown in the accompanying drawings shall be interpreted as illustrative and not in a limiting sense

I claim:

1. A device to aid a person to open a car door, and which is to be attached to the car door, which device comprises:
    a main body, comprising a backer and an insert, the backer of which is of a generally rectangular configuration viewed from the front, and is generally U-shaped viewed from the top, comprising a front section, a rear section and a transverse section connecting the front and rear sections, with a horizontal slot there between, the front section having an upwardly and rearwardly sloping front surface, the slot being covered at the bottom by a bottom wall;
    the insert comprising an elongated section normally disposed to a transverse section, the elongated section having an elevation slightly less than the elevation of the transverse section, to permit the insert to slide within the slot of the backer; and
    means for mounting the main body to an interior of said vehicle door.

2. The device of claim 1, further including an impact receiver disposed over a top and front of the main body.

3. The device of claim 2, wherein the impact receiver is polyurethane elastomer.

4. The device of claim 3, wherein the impact receiver is in the form of an inverted L-shaped member.

5. The device of claim 2, wherein the main body is made of polyurethane foam.

6. The device of claim 1, wherein the means for mounting the main body is adhesive backed hook and pile closure, a panel of one gender of which is attached to the main body's rear wall, and a panel of the other gender is attached to the interior of said vehicle door.

7. The device of claim 2, wherein adhesive backed hook and pile closure is disposed on both rear walls of both the backer and the insert.

8. The device of claim 2, wherein the impact receiver is color-keyed to match an interior of the car wherein it is to be placed.

9. The device of claim 1, wherein the means for mounting the main body is a pair of spaced brackets, one of which is attached to the backer and the other which is attached to the insert.

10. The device of claim 9, wherein the brackets match a color of an impact receiver that is attached to the main body.

11. The device of claim 8, wherein the impact receiver includes a layer of releaseable adhesive thereon to aid in attachment to the main body.

12. The device of claim 9, wherein the brackets are bolted through the main body for retention.

13. The device of claim 9, wherein each bracket includes at least one dome shaped thumb bolt for tightening the bracket within a door pocket.

14. The device of claim 10, wherein a pair of opposed dome shaped thumb bolt for tightening the bracket within a door pocket are employed.

* * * * *